United States Patent [19]

Poirier

[11] Patent Number: 4,683,005

[45] Date of Patent: Jul. 28, 1987

[54] ROAD ASPHALT COMPOSITIONS CONTAINING HYDROCRACKED PITCH

[75] Inventor: Marc-André Poirier, Sarnia, Canada

[73] Assignees: Mines and Resources Canada, Ottawa; Petro Canada Inc., Calgary, both of Canada

[21] Appl. No.: 849,411

[22] Filed: Apr. 8, 1986

Related U.S. Application Data

[63] Continuation-in-part of Ser. No. 664,398, Oct. 19, 1984, abandoned.

[51] Int. Cl.⁴ ............................................. C08L 95/00
[52] U.S. Cl. ................................. 106/273 R; 106/284
[58] Field of Search ................................ 106/273, 284

[56] References Cited

U.S. PATENT DOCUMENTS 3,330,759  7/1967  Henschel et al. ..................... 208/23
3,594,202  7/1971  Corbett et al. ........................ 208/23
4,139,397  2/1979  Yan ..................................... 106/278

FOREIGN PATENT DOCUMENTS 1114765  12/1981  Canada .
1151579  8/1983  Canada .

OTHER PUBLICATIONS

Chem. Abst. 96: 126,102k, Dec. 22, 1981, Nandi.

*Primary Examiner*—Theodore Morris
*Attorney, Agent, or Firm*—Wegner & Bretschneider

[57] ABSTRACT

The present invention relates to a paving grade asphalt composition which comprises a blend of (a) a petroleum pitch obtained as a residue in the hydrocracking of hydrocarbon oils and (b) as a diluent therefor an unprocessed distillation residue having a minimum initial boiling point of at least 200° C. obtained from bitumen from tar sands, or heavy oils or light oil from pure or mixed petroleum crude oils.

4 Claims, No Drawings

ROAD ASPHALT COMPOSITIONS CONTAINING HYDROCRACKED PITCH

This is a continuation-in-part application of Ser. No. 664,398, filed Oct. 19, 1984, now abandoned.

This invention relates to bituminous compositions and, more particularly, asphaltic compositions which are suitable for use as paving materials.

Asphalt is a natural constituent of crude oils and is typically produced from the distillation residues of refining feedstocks. This product is of very significant industrial importance since it is widely used in the construction of roads, building materials and other industrial applications. This asphalt has normally been obtained from conventional petroleum oils.

With the changing economics of the petroleum industry, there is a trend toward the conversion of heavy hydrocarbon oils, such as the distillation residues, to light and intermediate naphthas of good quality for reforming feedstock, fuel oil and gas oils. These residues represent the normal sources of paving asphalts.

In the case of heavy bituminous oils, such as those extracted from tar sands, the upgrading trend today is away from coking and it is expected that all future upgrading will be by various hydroprocessing techniques, such as hydrocracking. The processing residues obtained from such techniques do not produce satisfactory road asphalts.

Attempts have been made to blend these processed residues with normal asphalts. For instance, studies were carried out by H. Girzonas at the Montreal Refinery of Petro-Canada on the use of a pitch residue from hydrocracking Light Arabian crude to a 75% pitch conversion as a blending agent with commercial asphalt cements. However, it has been found that only about ten percent of the pitch residues obtained could be successfully blended with traditional asphalt compositions.

There is, therefore, a need in the industry for some type of asphaltic composition which can utilize greater concentrations of the processed residues or pitches. Asphalt cement specifications for road paving purposes are given in table I below:

TABLE 1

| Asphalt cement specifications for road purpose (16-GP-3M) | | | | | | |
|---|---|---|---|---|---|---|
| Grade | 85–100 | | 120–150 | | 150–200 | ASTM |
| Requirements | Min. | Max. | Min. | Max. | Min. | Max | Method |
| Penetration (25° C., 100 g, 5 s) | 85 | 100 | 120 | 150 | 150 | 200 | D 5 |
| Flash point (CO C. °C.) | 230 | — | 220 | — | 220 | — | D 92 |
| Ductility (25° C., 5 cm/min, cm) | 100 | — | 100 | — | 100 | — | D 113 |
| Thin film oven test (Pen. of residue % of original Pen.) | 47 | — | 42 | — | 40 | — | D 1745 |
| Solubility in Trichloroethylene (wt %) | 99.0 | — | 99.0 | — | 99.0 | — | D 2042 |

It has been found in accordance with the present invention that while neither the pitches obtained from petroleum processing nor virgin bitumens, such as Athabasca bitumen, meets the above specifications for paving asphalt, blends of these two materials do meet the requirements.

Thus, the invention in its broadest aspect relates to a paving grade asphalt composition which comprises a blend of (a) a petroleum pitch obtained as a residue in the hydrocracking of hydrocarbon oils and (b)) as a diluent therefor an unprocessed distillation residue having a minimum initial boiling point of at least 200° C. obtained from bitumen from tar sands, or heavy oils or light oil from pure or mixed petroleum crude oils.

The pitches that are used in the present invention are residues of hydrocracking which usually boil above 524° C. and they may come from the hydrocracking of regular crude oils or from the hydrocracking of heavy hydrocarbon oils, including heavy bituminous oils extracted from tar sands. While the pitches which can be used may be derived from processes providing a wide range of pitch conversions, they are usually derived from processes having a pitch conversion of at least 40% and preferably in excess of 80% pitch conversion, such as that described in Canadian Pat. No. 1,151,579, issued Aug. 9, 1983. The pitches contain up to 10% saturates, about 10–30% aromatics, about 15–30% resins and about 30–55% asphaltenes.

The diluents are natural or virgin hydrocarbon products in that they have been subjected to distillation only. While distillation residues can be used having a minimum initial boiling point as low as 200° C., it is particularly advantageous to use distillation residues having an initial boiling point of greater than 370° C. They should also have a minimum flash point of 230° C.

These diluents can be obtained from a wide variety of natural or virgin sources, including bitumen from tar sands, heavy oils and light oils from pure or mixed petroleum crude oils. The bitumens and heavy oils normally contain a large proportion of materials which boil above 524° C., and a particularly suitable diluent is one derived from Athabasca bitumen.

The processed pitch and the virgin bitumen or heavy oil can be blended in widely varying proportions, provided the resulting blend meets the specifications of Table 1. However, the composition of this invention is particularly valuable in its ability to accept large proportions of pitches derived from high pitch conversion processes. Preferably at least 25% processed pitch is utilized in the compositions of this invention. According to a particularly preferred embodiment, at least 35% by weight of a pitch obtained from a greater than 80% pitch conversion process is combined with a virgin bitumen from tar sands or a virgin heavy oil. Throughout this specification, certain terms of art are used which are defined as follows:

Deasphaltening

The asphaltene portion was precipitated by the addition of twenty volumes of n-heptane to one volume of asphalt blend. The slurry was agitated for 15 min. in a ultrasonic bath and the asphaltenes (n-heptane insolubles), were separated by filtration on a Whatman filter paper (No. 1). The asphaltenes were washed with 10 volumes of n-heptane, dried at 50° C. under reduced pressure. The maltenes (n-heptane solubles) and washings were combined and the solvent removed using a Buchi-Rotavapor. The asphaltenes obtained by this method would also contain the toluene insolubles.

Compound Type Separation

The deasphaltened blend (about (1.4 g) was separated into compound-type concentrates of saturates, monodiaromatics, polynuclear aromatics and resins on a dual packed silica-gel alumina column. The column consists of a vertical stainless steel tube (137 × 1.25 cm o.d.) packed in its lower half with 37 g of activated silica gel D-12 and top half with 47 g of activated alumina F-20. The following eluant sequence was used to elute the corresponding compound-type concentrates: n-pentane (330 mL), n-pentane/benzene 10% (500 mL), benzene/ethyl acetate 5% (130 mL) and methanol (200 mL) followed by benzene (100 mL) and 100 mL of pentane. A Lapp pump LS-30 was used with a flow rate of about 5 mL/min.

Molecular Weight Determination by Gel Permeation Chromatography

The Gel Permeation Chrmoatography (GPC) work was performed on a Beckman Model 112 High Performance Liquid Chromatograph. The molecular weight determination were made using two GPC systems — one system using 500Å and 100 Å Ultrastyragel columns (Waters Associates) in series and other systems with 1000Å and 100Å Ultrastyragel columns in series. Tetrahydrofuran (THF) (Burdick and Jackson "distilled in glass") was used at 1 mL/min. flow rate as mobile phase. The concentrations of the samples in THF were limited to 0.1-0.25% in order to avoid "concentration effects" on the retention results. The column eluate was monitored with a Schoeffel Model SF770 UV-vis detector operating at 254 nm and the data were recorded on a Spectra Physics SP4100 printer plotter.

Elemental Analysis and Physical Tests

The samples were analyzed for C, H, N on a Perkin Elmer model 240 Analyzer and the sulphur was determined on a LECO.

The physical tests, viscosity, penetration, ductility, solubility in trichloroethylene and softening point were performed according to the ASTM procedures.

Certain preferred features of the present invention will be better understood from consideration of the experimental data in the following examples.

EXAMPLE 1

A variety of blending products were prepared as follows:

Diluents
1. Athabasca bitumen obtained from SUNCOR, Fort McMurray.
2. Asphalt cement 150-200 pen obtained from Petro-Canada Refinery, Montreal East, composed of Light Saskatchewan blend, AghaJari, Mexican and other crude distillation residues.
3. Asphalt cement 150-200 pen obtained from Petro-Canada, Taylor Refinery, B.C., composed of Boundary Lake and B.C. Light distillation residues.

Pitches (Residues of hydrocracking boiling above 524° C.)
1. Athabasca pitch, 80% pitch conversion,
2. Light Arabian pitch, 23% pitch conversion,
3. Light Arabian pitch, 49% pitch conversion,
4. Light Arabian pitch, 76% pitch conversion,
5. Light Arabian pitch, 86% pitch conversion.

The above blending materials had the chemical analyses and physical properties shown in Tables 2 and 3 below:

TABLE 2

| | Ultimate analysis of the pitches and diluents | | | | | | | |
|---|---|---|---|---|---|---|---|---|
| Conversion | 23% | 49% | 76% | 86% | 80% | Asphalt | Asphalt | Athabasca bitumen +200° C. |
| Sample No. | SR-1 | SR-42 | 82CG37 | 81CG72 | 78CG14 | Montreal | Taylor | |
| Specific gravity 15/15° C. | 1.044 | 1.102 | 1.144 | 1.189 | 1.138 | 1.024 | 1.008 | 1.013 |
| Carbon, wt % | 84.57 | 84.31 | 84.06 | 89.22 | 86.44 | 84.19 | 86.62 | 82.13 |
| Hydrogen, wt % | 9.75 | 8.59 | 7.54 | 5.91 | 7.66 | 9.84 | 7.81 | 10.02 |
| Sulphur, wt % | 4.50 | 5.36 | 3.54 | 4.04 | 4.51 | 4.21 | 2.24 | 4.65 |
| Nitrogen, wt % | 0.50 | 0.55 | 1.20 | 1.04 | 1.34 | 0.53 | 0.65 | 0.35 |
| R.C.R., wt % | 24.6 | 38.0 | 45.4 | 64.7 | 48.0 | 19.0 | 19.9 | 14.0 |
| Heptane solubles, wt % | 79.1 | 62.9 | 52.3 | 33.4 | 56.3 | 80.6 | 91.5 | 84.0 |
| Heptane insol., wt % | 20.9 | 37.1 | 47.4 | 66.6 | 43.7 | 19.4 | 8.5 | 16.0 |
| Toluene insol., wt % | 1.6 | 7.1 | 6.0 | 16.4 | 2.4 | 0.3 | 0.4 | 0.7 |
| Vanadium, ppm | 196 | 169 | 231 | 113 | 86 | 514 | 243 | 214 |
| Nickel, ppm | 48 | 43 | 156 | 120 | 52 | 87 | 82 | 84 |
| Iron, ppm | 3274 | 2685 | 760 | 627 | 236 | 207 | 116 | 312 |
| Ash, wt % | 0.79 | 1.25 | 0.95 | 0.51 | 0.05 | 0.09 | 0.05 | 0.61 |

TABLE 3

| | Physical properties of the pitches and diluents | | | | | | | |
|---|---|---|---|---|---|---|---|---|
| Conversion | 23% | 49% | 76% | 86% | 80% | Asphalt | Asphalt | Athabasca bitumen +200° C. |
| Sample No. | SR-1 | SR-42 | 82CG37 | 81CG72 | 78CG14 | Montreal | Taylor | |
| Specific gravity 15/15° C. | 1.044 | 1.102 | 1.144 | 1.189 | 1.138 | 1.024 | 1.008 | 1.013 |
| Penetration 25° C., 100 g, 5s | 123 | 7 | 0 | 0 | 0 | 157 | 168 | Too soft |
| Ductility, 25° C. | — | — | 0 | 0 | 0 | — | — | — |
| Viscosity @ 135° C. Kn cSt | 208 | — | — | — | — | 217 | 205 | 58 |
| Solubility in Trichlorethylene, % | 98.4 | 96.8 | 98.1 | 93.6 | 98.4 | 99.9 | 99.9 | 99.8 |
| Softening point, °C. | 43 | 85 | 102 | 110 | 107 | 43 | 43 | 4 |
| Flash point (COC), °C. | 346 | 345 | →327 | →350 | 346 | 310 | 332 | 254 |
| Thin film oven test PEN of residue at 25° C., 100 g, 5s % of original pen | — | — | — | — | | | | Too soft |

It will be seen from the physical properties that the blending materials by themselves are not suitable for road asphalts as they do not meet the specifications set out in Table 1 above.

Blending

Different blends were prepared using as one component of each blend one of the pitches described above and as the other component as diluent selected from the Athabasca bitumen and the two refinery asphalts. These blends were prepared to meet the 85-100 penetration specification of Table 1. The different amounts of pitch that could be used in the different blends are set out in Table 4 below.

TABLE 4

| | Weight percent of pitch in blend mixtures which meet 85-100 penetration (100 g, 5 sec, 0.1 mm) | | |
|---|---|---|---|
| Diluents | Montreal (pen) Asphalt 150-200 | Taylor (pen) Asphalt 150-200 | Athabasca (pen) bitumen |
| Pitch | | | |
| LA 23% PC | — | — | 100 (23) |
| LA 49% PC | 14 (85) | 14 (87) | 51 (90) |
| LA 76% PC | 10 (88) | 10 (86) | 40 (89) |
| LA 86% PC | 8 (98) | 11 (91) | 35 (98) |
| Athab. 80% PC | 8 (87) | 11 (91) | 36 (86) |

It will be seen from the above table that the most promising results were obtained using Athabasca bitumen as diluent. Thus, it was found that 35 percent by weight of the light Arabian high conversion pitch (86%) could be used in the blend. This result represents a significant breakthrough for pitch utilization in road asphalts.

The results also show that the amount of pitch that can be included in the blend increases with decreasing pitch conversion. The asphaltic properties of the low conversion pitch (23%) indicate that this pitch is quite close to 150-200 penetration asphalt.

Using asphalt cement from the refineries as diluent, it will be seen that only about 8-14 percent by weight of pitch could be added to the blends.

The chemical anaylses and the physical properties of the 12 different blends that were prepared are shown in Tables 5 and 6 below.

TABLE 5

| | Ultimate analysis of the asphalt blended samples | | | | | | | | | | | |
|---|---|---|---|---|---|---|---|---|---|---|---|---|
| Sample No. | LA 49% Mtl 1 | LA 49% Taylor 2 | LA 49% Athab 3 | LA 76% Mtl 4 | LA 76% Taylor 5 | LA 76% Athab 6 | LA 86% Mtl 7 | LA 86% Taylor 8 | LA 86% Athab 9 | Atha 80% Mtl 10 | Atha 80% Taylor 11 | Atha 80% Athab 12 |
| Specific gravity 15/15° C. | 1.0383 | 1.0194 | 1.0694 | 1.0343 | 1.0184 | 1.0613 | 1.0359 | 1.0268 | 1.0772 | 1.0421 | 1.0101 | 1.0630 |
| Carbon, wt % | 84.84 | 86.06 | 83.37 | 84.64 | 86.55 | 84.77 | 84.33 | 86.68 | 82.48 | 84.97 | 85.99 | 83.18 |
| Hydrogen, wt % | 9.64 | 9.95 | 8.89 | 9.59 | 10.09 | 8.75 | 9.48 | 9.98 | 8.38 | 9.97 | 9.95 | 8.92 |
| Sulfur, wt % | 4.14 | 2.34 | 4.97 | 4.00 | 2.12 | 4.62 | 4.06 | 2.16 | 4.83 | 3.95 | 2.11 | 4.42 |
| Nitrogen, wt % | 0.46 | 0.56 | 0.54 | 0.79 | 0.61 | 0.60 | 0.51 | 0.61 | 0.81 | 0.73 | 0.94 | 0.78 |
| Heptane solubles, wt % | 78.4 | 85.5 | 75.8 | 75.5 | 86.2 | 75.7 | 78.9 | 82.4 | 73.9 | 79.4 | 85.8 | 73.7 |
| Heptane insolubles, wt % | 21.6 | 14.5 | 24.2 | 24.5 | 13.8 | 24.3 | 21.1 | 17.6 | 26.1 | 20.6 | 14.2 | 26.3 |
| Toluene insolubles, wt % | 0.7 | 0.7 | 2.2 | 0.3 | 0.4 | 0.6 | 0.7 | 0.9 | 3.6 | 0.7 | 0.6 | 0.9 |
| Vanadium, ppm | 397 | 240 | 221 | 391 | 243 | 186 | 453 | 285 | 321 | 538 | 257 | 243 |
| Nickel, ppm | 74 | 75 | 69 | 71 | 78 | 78 | 82 | 83 | 92 | 97 | 93 | 113 |
| Iron, ppm | 443 | 561 | 2020 | 75 | 113 | 222 | 646 | 729 | 2396 | 191 | 138 | 400 |
| Ash, wt % | 0.25 | 0.22 | 0.94 | 0.18 | 0.14 | 0.75 | 0.12 | 0.10 | 0.58 | 0.09 | 0.05 | 0.41 |

TABLE 6

| | Physical properties of the asphalt blends | | | | | | |
|---|---|---|---|---|---|---|---|
| Blends | Penetration 25°C. 100 g, 5s | Viscosity Kn cst. 135° C | Ductility 25° C. | Softening point, °C. | Solubility trichloro. % | Flash point °C. | Thin film oven test pen. % of original |
| 1. LA 49/Mtl | 85 | 352 | 140 | 49.0 | 99.4 | 313 | 66 |
| 2. LA 49/Taylor | 87 | 310 | — | 48.0 | 99.4 | 334 | — |
| 3. LA 49/Athab. | 90 | 266 | 132 | 50.0 | 98.0 | 289 | 55 |
| 4. LA 76/Mtl | 88 | 320 | — | 49.5 | 99.9 | 320 | — |
| 5. LA 76/Taylor | 86 | 310 | — | 48.5 | 99.7 | 330 | — |
| 6. LA 76/Athab. | 89 | 246 | 140 | 48.0 | 99.5 | 279 | 49 |
| 7. LA 86/Mtl | 98 | 265 | 62 | 50.5 | 99.5 | 318 | 68 |
| 8. LA 86/Taylor | 91 | 256 | — | 51.5 | 99.5 | 340 | — |
| 9. LA 86/Athab. | 98 | 224 | (75) | 48.5 | 99.0 | 268 | 46 |
| 10. Athab. 80/Mtl | 87 | 410 | — | 49.0 | 99.7 | 314 | — |
| 11. Athab. 80/Taylor | 91 | 342 | — | 51.0 | 99.6 | 340 | — |
| 12. Athab. 80/Athab. | 86 | 235 | 132 | 47.5 | 99.2 | 280 | 47 |

The asphalt blends in which the Montreal or Taylor asphalt was used showed higher H/C ratios compared to asphalt blends where Athabasca bitumen was used. This indicates that the bitumen-pitch blends are more hydrogen deficient and consist of materials less desirable for upgrading feedstocks.

In most asphalt work, normal heptane insolubles and toluene solubles have been defined as asphaltenes. The treatment of an asphalt with a paraffinic solvent upsets the solubility equilibrium of the very complex mixture of asphalt components and the more polar compounds able to form strong intermolecular associations precipitate as asphaltenes. The asphaltenes are not only desirable components in asphalt, but they determine to a great extent the physical properties of the asphalt.

The gel permeation chromatography as mentioned hereinbefore (GPC) has been the subject of many studies for the determination of molecular weight of asphalts. This technique was used for determining average molecular weight of the asphalt blends obtained and their maltene and asphaltene components. The results of these analyses are shown in Tables 7 and 8 below.

TABLE 7

Molecular weight determination of CANMET pitches and diluents

| Sample | Average molecular weight | | |
|---|---|---|---|
| | Total sample | Maltenes | Asphaltenes |
| Pitch LA 23% | 817 | 770 | 1685 |
| Pitch LA 49% | 630 | 605 | 936 |
| Pitch LA 76% | 406 | 390 | 523 |
| Pitch LA 86% | 265 | 245 | 295 |
| Pitch Atha. 80% | 521 | 404 | 823 |
| Montreal AC 150-200 | 1599 | 1196 | 3319 |
| Taylor AC 150-200 | 1336 | 1228 | 2747 |
| Athabasca bitumen | 1783 | 1226 | 6020 |

+200° C.

TABLE 8

Molecular weight determination of the asphalt blends

| Blends | Average molecular weight | | |
|---|---|---|---|
| | Total sample | Maltenes | Asphaltenes |
| 1. LA 49/Mtl | 1368 | 952 | 2830 |
| 2. LA 49/Taylor | 1023 | 982 | 2019 |
| 3. LA 49/Athab. | 1065 | 763 | 1950 |
| 4. LA 76/Mtl | 1172 | 975 | 2838 |
| 5. LA 76/Taylor | 1114 | 957 | 1824 |
| 6. LA 76/Athab. | 999 | 676 | 1421 |
| 7. LA 86/Mtl | 1263 | 915 | 2579 |
| 8. LA 86/Taylor | 987 | 832 | 1680 |
| 9. LA 86/Athab. | 854 | 619 | 1506 |
| 10. Athab. 80/Mtl | 1319 | 1048 | 2934 |
| 11. Athab. 80/Taylor | 1097 | 1023 | 2072 |
| 12. Athab. 80/Athab. | 1081 | 754 | 1845 |

The results show that the average molecular weight of the whole pitches and their maltenes and asphaltenes decrease with increasing severity of hydrocracking. The amount of pitch that can be mixed with a diluent is expressed in terms of the asphaltenes content and average molecular weight of the pitch and the diluent. This explains why two asphalts of a given penetration may have different asphaltene contents and average molecular weights with similar saturates and aromatics composition.

The compound-type distribution results of the pitches and diluents are shown in Tables 9 and 10 below.

TABLE 9

Compound-type distribution of the pitches and diluents of the n-heptane solubles (wt %)

| Sample | Saturates | Mono-diaromatics | Poly-aromatics | Resins |
|---|---|---|---|---|
| Pitch LA 23% | 19.8 | 23.9 | 32.1 | 24.2 |
| Pitch LA 49% | 10.0 | 13.3 | 25.8 | 50.9 |
| Pitch LA 76% | 11.8 | 11.0 | 30.1 | 47.1 |
| Pitch LA 86% | 11.8 | 9.1 | 24.5 | 54.6 |
| Pitch Atha 80% | 9.6 | 13.6 | 30.4 | 46.4 |
| Athabasca bitumen (+200) | 26.1 | 22.2 | 26.8 | 24.9 |
| Asphalt Montreal (150-200) | 19.1 | 21.4 | 26.0 | 33.5 |
| Asphalt Taylor (150-200) | 25.4 | 23.1 | 28.5 | 23.0 |

TABLE 10

Compound-type distribution of the pitches and diluents (wt %)

| Sample | Saturates | Aromatics | Resins | Asphaltenes |
|---|---|---|---|---|
| Pitch LA 23% | 15.7 | 44.3 | 19.1 | 19.3 |
| Pitch LA 49% | 6.3 | 24.6 | 32.0 | 30.0 |
| Pitch LA 76% | 6.2 | 21.5 | 24.6 | 41.7 |
| Pitch LA 86% | 4.0 | 11.2 | 18.2 | 50.2 |
| Pitch Atha 80% | 5.4 | 24.8 | 26.1 | 41.3 |
| Asphalt Montreal (150-200) | 15.4 | 38.2 | 27.0 | 19.1 |
| Asphalt Taylor (150-200) | 23.2 | 47.2 | 21.1 | 8.1 |
| Athabasca bitumen (+200) | 21.9 | 41.2 | 20.9 | 15.3 |

The results in Table 9 on the n-heptane soluble portion of the pitches show increasing resins content with increasing pitch conversion. The resins are desirable components in road asphalts. The composition of Athabasca bitumen is similar to the composition of the refinery asphalts.

Table 10 shows the whole composition of the pitches and diluents (except the toluene insolubles). The asphaltene contents of the pitches increase with increasing severity of hydrocracking. Again, the total composition of Athabasca bitumen is similar to the composition of the refinery asphalts. Based on this table, a preferred range is 4-10% saturates, 10-26% aromatics, 15-30% resins and 30-52% asphaltenes.

The compound-type distribution of the asphalt blended samples is given in Tables 11 and 12 below.

TABLE 11

Compound-type distribution of the n-heptane deasphaltened asphalt blended samples

| Blends | Wt % | | | |
|---|---|---|---|---|
| | Saturates | Mono-diaromatics | Poly-aromatics | Resins |
| 1. LA 49/Mtl | 20.2 | 21.7 | 30.0 | 28.1 |
| 2. LA 49/Taylor | 17.7 | 26.3 | 20.2 | 35.8 |
| 3. LA 49/Athab. | 16.3 | 17.5 | 26.6 | 39.6 |
| 4. LA 76/Mtl | 22.0 | 18.5 | 25.7 | 33.8 |
| 5. LA 76/Taylor | 22.3 | 20.3 | 28.5 | 28.9 |
| 6. LA 76/Athab. | 21.4 | 19.6 | 27.4 | 31.6 |
| 7. LA 86/Mtl | 18.5 | 19.5 | 25.5 | 36.5 |
| 8. LA 86/Taylor | 22.2 | 19.7 | 25.0 | 33.1 |
| 9. LA 86/Athab. | 22.2 | 18.5 | 24.5 | 34.8 |
| 10. Athab. 80/Mtl | 20.6 | 19.2 | 25.7 | 34.5 |
| 11. Athab. 80/Taylor | 23.6 | 21.4 | 27.8 | 27.2 |
| 12. Athab. 80/Athab. | 22.8 | 18.4 | 28.1 | 30.7 |

TABLE 12

Compound-type distribution of asphalt blended samples

| Blends | Wt % | | | |
|---|---|---|---|---|
| | Saturates | Aromatics | Resins | Asphaltenes |
| 1. LA 49/Mtl | 15.9 | 40.5 | 22.0 | 20.9 |
| 2. LA 49/Taylor | 15.1 | 39.8 | 30.6 | 13.8 |
| 3. LA 49/Athab. | 12.4 | 33.4 | 30.0 | 22.0 |
| 4. LA 76/Mtl | 16.6 | 33.4 | 25.5 | 24.2 |
| 5. LA 76/Taylor | 15.0 | 29.2 | 42.0 | 13.4 |
| 6. LA 76/Athab. | 16.2 | 35.6 | 23.9 | 23.7 |
| 7. LA 86/Mtl | 14.6 | 35.5 | 28.8 | 20.4 |
| 8. LA 86/Taylor | 18.3 | 36.8 | 27.3 | 16.7 |
| 9. LA 86/Athab. | 16.4 | 31.8 | 25.7 | 22.5 |
| 10. Athab. 80/Mtl | 16.4 | 35.6 | 27.4 | 19.9 |
| 11. Athab. 80/Taylor | 20.2 | 42.3 | 23.3 | 13.6 |
| 12. Athab. 80/Athab. | 16.8 | 34.3 | 22.6 | 25.4 |

In general, the compound-type distribution of all of the asphalt blends is similar to the composition of the Montreal asphalt, except in some cases where the resins content is higher. As far as the bitumen-pitch blends are concerned, the major portion of the saturates is provided by the bitumen and the major portion of the resins is provided by the pitches. In the asphalt-pitch blends, part of the resins portion is also provided by the pitches.

I claim:

1. A paving grade asphalt composition having an ASTM penetration value of at least 85 at 25° C. and a solubility in trichloroethylene of at least 99.0% comprising a blend of:

(a) a petroleum pitch having a boiling point above 524° C. obtained as a residue in the hydrocracking of hydrocarbon oils to a pitch conversion of at least 80% and containing up to 10% by weight saturates, about 10–30% by weight aromatics, about 15–30% by weight resins and about 30–55% by weight asphaltenes and (b) as a diluent therefor an unprocessed distillation residue having a minimum initial boiling point of 370° C. obtained from a bitumen from tar sands, or heavy oils, the pitch being present in the composition in an amount of at least 25% by weight of the total composition.

2. A composition according to claim 1 wherein the hydrocracked pitch is present in the composition in an amount of at least 35% by weight of the total composition.

3. A composition according to claim 2 wherein the pitch contains 4–10% by weight saturates, 10–26% by weight aromatics, 15–30% by weight resins and 30–52% by weight asphaltenes.

4. A composition according to claim 2 wherein the diluent is derived from Athabasca bitumen.

* * * * *